US010331910B2

(12) United States Patent
Kolk et al.

(10) Patent No.: US 10,331,910 B2
(45) Date of Patent: Jun. 25, 2019

(54) SYSTEM AND METHOD FOR PERFORMING BIOMETRIC OPERATIONS IN PARALLEL USING DATABASE AND BIOMETRIC OPERATIONS PLUG-INS

(71) Applicant: AWARE, INC., Bedford, MA (US)

(72) Inventors: Steven Kolk, Burlington, MA (US); Louis Scott Hills, Stow, MA (US)

(73) Assignee: AWARE, INC., Bedford, MA (US)

( * ) Notice: Subject to any disclaimer, the term of this patent is extended or adjusted under 35 U.S.C. 154(b) by 39 days.

(21) Appl. No.: 15/314,423

(22) PCT Filed: May 18, 2015

(86) PCT No.: PCT/US2015/031343
§ 371 (c)(1),
(2) Date: Nov. 28, 2016

(87) PCT Pub. No.: WO2015/191246
PCT Pub. Date: Dec. 17, 2015

(65) Prior Publication Data
US 2017/0102970 A1  Apr. 13, 2017

Related U.S. Application Data

(60) Provisional application No. 62/009,516, filed on Jun. 9, 2014.

(51) Int. Cl.
*G06F 9/50* (2006.01)
*G06F 9/28* (2006.01)
(Continued)

(52) U.S. Cl.
CPC ........... *G06F 21/71* (2013.01); *G06F 9/28* (2013.01); *G06F 21/32* (2013.01); *G06F 21/83* (2013.01);
(Continued)

(58) Field of Classification Search
None
See application file for complete search history.

(56) References Cited

U.S. PATENT DOCUMENTS 5,838,812 A * 11/1998 Pare, Jr. ............... G06F 21/32
                                                      382/115
6,256,737 B1 * 7/2001 Bianco .................. G06F 21/32
                                                      713/186
(Continued)

FOREIGN PATENT DOCUMENTS

WO   WO 2005/001748         1/2005
WO   WO-2005001748 A2 *  1/2005   ........... G06F 21/316

OTHER PUBLICATIONS

International Search Report for International Application No. PCT/US2015/031343, dated Aug. 18, 2015.
(Continued)

*Primary Examiner* — Abu Zar Ghaffari
(74) *Attorney, Agent, or Firm* — Jason H. Vick; Sheridan Ross, PC

(57) ABSTRACT

Methods and computer systems execute biometric operations in parallel. The performance of a biometric operation includes receiving a job request to perform the biometric operation. The job request includes input data, identifies a database to be used in the performance of the biometric operation, and specifies a function to be performed. The biometric operation is restructured as one or more tasks. A number of entries in the database is assigned to each of the one or more tasks. An independent worker process is generated for each different core of the multi-core processor. Each task of the one or more tasks is assigned to one of the worker processes. Results produced by each worker process assigned one of the one or more tasks are collected. A result of the biometric operation based on the collected results is reported.

22 Claims, 3 Drawing Sheets

(51) Int. Cl.
*G06F 21/71* (2013.01)
*G06F 21/32* (2013.01)
*G06F 21/83* (2013.01)
*G06Q 20/40* (2012.01)
*G06F 21/31* (2013.01)
*G06F 8/36* (2018.01)
*G06F 9/445* (2018.01)

(52) U.S. Cl.
CPC ............ *G06F 8/36* (2013.01); *G06F 9/44526* (2013.01); *G06F 9/5027* (2013.01); *G06F 21/31* (2013.01); *G06F 2221/031* (2013.01); *G06F 2221/2117* (2013.01); *G06Q 20/40145* (2013.01)

(56) References Cited

U.S. PATENT DOCUMENTS

| | | | | |
|---|---|---|---|---|
| 6,325,292 | B1* | 12/2001 | Sehr | G06Q 20/341 235/375 |
| 6,591,249 | B2* | 7/2003 | Zoka | G06Q 20/206 235/382 |
| 7,298,873 | B2 | 11/2007 | Miller, Jr. et al. | |
| 7,542,590 | B1* | 6/2009 | Robinson | G06K 9/00006 382/115 |
| 8,572,398 | B1* | 10/2013 | Duncan | G06Q 20/40145 713/186 |
| 8,612,947 | B2 | 12/2013 | LeRoux et al. | |
| 8,640,115 | B2 | 1/2014 | Buckley et al. | |
| 8,661,516 | B2* | 2/2014 | Yamada | G06K 9/00006 382/115 |
| 8,832,124 | B2* | 9/2014 | Partington | G06K 9/00973 707/754 |
| 8,887,259 | B1* | 11/2014 | Harding | G06F 21/6254 713/185 |
| 9,378,380 | B1* | 6/2016 | Reid | G06F 21/602 |
| 9,386,016 | B2* | 7/2016 | Takamizawa | H04L 63/0861 |
| 2004/0034783 | A1* | 2/2004 | Fedronic | G06F 21/32 713/186 |
| 2004/0192438 | A1* | 9/2004 | Wells | G06F 21/32 463/29 |
| 2005/0125339 | A1* | 6/2005 | Tidwell | G06Q 20/042 705/39 |
| 2005/0223016 | A1* | 10/2005 | Wang | G06F 17/30536 |
| 2006/0104493 | A1 | 5/2006 | Hsieh et al. | |
| 2006/0129838 | A1* | 6/2006 | Chen | G06F 21/32 713/186 |
| 2006/0222211 | A1* | 10/2006 | Olivo, Jr. | G06K 9/00885 382/115 |
| 2007/0283164 | A1* | 12/2007 | Nishizawa | H04L 63/0861 713/186 |
| 2008/0052527 | A1* | 2/2008 | Siedlarz | G06F 21/32 713/186 |
| 2008/0122675 | A1* | 5/2008 | Bilodeau | G06F 17/30893 341/176 |
| 2008/0159598 | A1* | 7/2008 | Iasso | G06K 9/00885 382/115 |
| 2009/0150898 | A1* | 6/2009 | Sohn | G06F 9/4881 718/105 |
| 2010/0158323 | A1* | 6/2010 | Muquit | G06K 9/00973 382/115 |
| 2010/0257369 | A1* | 10/2010 | Baker | G06F 21/32 713/186 |
| 2011/0184757 | A1* | 7/2011 | Daniel | G06F 19/3456 705/3 |
| 2011/0310044 | A1* | 12/2011 | Higuchi | G06F 1/1684 345/173 |
| 2012/0169463 | A1* | 7/2012 | Shin | G06F 21/32 340/5.82 |
| 2013/0145348 | A1* | 6/2013 | Agovic | G06F 17/3056 717/120 |
| 2013/0159021 | A1* | 6/2013 | Felsher | G06F 19/328 705/3 |
| 2013/0266193 | A1 | 10/2013 | Tiwari et al. | |
| 2013/0332511 | A1* | 12/2013 | Hala | H04L 67/34 709/203 |
| 2013/0332996 | A1* | 12/2013 | Fiala | H04L 63/083 726/4 |
| 2014/0108656 | A1 | 4/2014 | Salinca et al. | |
| 2014/0279858 | A1* | 9/2014 | Stephanson | G06K 9/00892 707/609 |
| 2014/0354405 | A1* | 12/2014 | Kocher | G06F 21/32 340/5.82 |
| 2015/0169602 | A1* | 6/2015 | Shankar | G06F 17/30091 707/825 |

OTHER PUBLICATIONS

Written Opinion for International Application No. PCT/US2015/031343, dated Aug. 18, 2015.
NeuroTechnology "Smart Card Multi-Biometrics: MegaMatcher on Card SDK" Feb. 28, 2014.
European Search Report for European Application No. 15805884.2, dated Dec. 7, 2017.
International Preliminary Report on Patentability for International Application No. PCT/US2015/031343, dated Dec. 22, 2016.
Intention to Grant for European Application No. 15805884.2, dated Jan. 3, 2019.

\* cited by examiner

SYSTEM AND METHOD FOR PERFORMING BIOMETRIC OPERATIONS IN PARALLEL USING DATABASE AND BIOMETRIC OPERATIONS PLUG-INS

RELATED APPLICATION

This application is a national stage application under 35 U.S.C. 371 of PCT Application No. PCT/US2015/031343, filed May 18, 2015, which designated the Unites States, which PCT application claims the benefit of and priority to U.S. provisional application no. 62/009,516, filed Jun. 9, 2014, titled "System and Method for Performing Biometric Operations in Parallel," each of which are incorporated in herein by reference in their entirety.

FIELD OF THE INVENTION

The present invention relates generally to biometric systems.

BACKGROUND

Biometrics, broadly defined, is the measurement and analysis of unique physical or behavioral characteristics used to distinguish one individual from another and, thus, to identify or authenticate the identity of individuals. Identification is the process of identifying or detecting the identity of an unknown individual. Authentication is the process of verifying an individual as whom he or she claims to be. Common examples of biometrics used for identification and authentication include fingerprints, irises, retinas, and facial images.

The process of identification typically involves comparing a target biometric sample from an unknown individual against a large database of stored biometric information, in search of a match. However, a fingerprint database, for example, can include thousands upon thousands of instances of fingerprint data from a variety of sources. Although computer systems can automate the search, the matching process can run slowly because of several factors, including the sheer number of entries in the database, the nature and quality of the biometric information in the database and of the biometric sample, and the requisite degree of accuracy.

SUMMARY

All examples and features mentioned below can be combined in any technically possible way.

In one aspect, a method of performing a biometric operation is provided. The method comprises receiving a job request to perform a biometric operation. The job request includes input data, identifies a database to be used in the performance of the biometric operation, and specifies a function to be performed. The biometric operation is restructured as one or more tasks. A number of entries in the database is assigned to each of the one or more tasks. An independent worker process is generated for each different core of the multi-core processor. Each task of the one or more tasks is assigned to one of the worker processes. Results produced by each worker process assigned one of the one or more tasks are collected. A result of the biometric operation based on the collected results is reported.

Embodiments of the method may include one of the following features, or any combination thereof.

Each task may include a plug-in, the function to perform, the input data, and a list of database entries on which to perform the function. The one or more tasks may be a plurality of tasks, and the method may further comprise distributing the plurality of tasks among the worker processes for processing the tasks in parallel. The biometric operation may be to enroll biometric information into the database. The biometric operation may be to perform an identification query based on a biometric sample provided as the input data.

The method may further comprise detecting a number of the processor cores at runtime. An aggregate number of entries assigned to the one or more tasks may be all entries or a subset of all entries in the database.

The job request may be a map job request to apply a plug-in function across a number of entries in the database, and wherein the biometric operation may be restructured into a plurality of tasks distributed among the worker processes. The job request may be a standard job request, and wherein the biometric operation may be restructured into a single task assigned to one of the worker processes.

Assigning each task of the one or more tasks to one of the worker processes may comprise placing each task of the one or more tasks into a queue, removing one task of the one or more tasks from the queue in response to one of the worker processes being available to process the removed task, and assigning the one task removed from the queue to the available worker process.

In another aspect, a computer program product is provided for performing a biometric operation comprises a non-transitory computer readable storage medium having computer readable program code embodied therewith. The computer readable program code comprises computer readable program code that, if executed, receives a job request to perform a biometric operation. The job request includes input biometric data, identifies a database to be used in the performance of the biometric operation, and specifies a function to be performed. The computer readable program code further comprises computer readable program code that, if executed, restructures the biometric operation as one or more tasks, computer readable program code that, if executed, assigns a number of entries in the database to each of the one or more tasks, computer readable program code that, if executed, generates an independently executing worker process for each different core of the multi-core processor, computer readable program code that, if executed, assigns each task of the one or more tasks to one of the worker processes, computer readable program code that, if executed, collects results produced by each worker process assigned one of the one or more tasks, and computer readable program code that, if executed, reports a result of the biometric operation based on the collected results.

Embodiments of the computer program product may include one of the following features, or any combination thereof.

Each task may include a plug-in, the function to perform, the input data, and a list of database entries on which to perform the function. The one or more tasks may be a plurality of tasks, and the method may further comprise distributing the plurality of tasks among the worker processes for processing the tasks in parallel. The biometric operation may be to enroll biometric information into the database. The biometric operation may be to perform an identification query based on a biometric sample provided as the input data.

The computer program product may further comprise computer readable program code that, if executed, detects a number of the processor cores at runtime.

An aggregate number of entries assigned to the one or more tasks may be all entries or a subset of all entries in the database.

The job request may be a map job request to apply a plug-in function across a number of entries in the database, and wherein the biometric operation may be restructured into a plurality of tasks distributed among the worker processes. The job request may be a standard job request, and wherein the biometric operation may be restructured into a single task assigned to one of the worker processes.

The computer readable program code that, if executed, assigns a number of entries in the database to each of the one or more tasks may comprise computer readable program code that, if executed, places each task of the one or more tasks into a queue, computer readable program code that, if executed, removes one task of the one or more tasks from the queue in response to one of the worker processes being available to process the removed task, and computer readable program code that, if executed, assigns the one task removed from the queue to the available worker process.

In another aspect, a computer system for performing a biometric operation is provided. The computer system comprises memory storing program code used to perform a biometric operation. The program code includes one or more database plugins, one or more biometric operation plugins, and program code that coordinates performance of the biometric operation. The computer system further comprises a multi-core processor executing the program code that coordinates performance of the biometric operation to: receive a job request to perform the biometric operation. The job request includes input biometric data, identifies one of the one or more database plug-ins to be used in the performance of the biometric operation, and specifies a function to be performed. The multi-core processor also executes the program code that coordinates performance of the biometric operation to: restructure the biometric operation as one or more tasks, assign a number of entries in the database to each of the one or more tasks, generate an independently executing worker process for each different core of the multi-core processor, assign each task of the one or more tasks to one of the worker processes, collect results produced by each worker process assigned one of the one or more tasks, and report a result of the biometric operation based on the collected results.

Embodiments of the computer system may include one of the following features, or any combination thereof.

Each task may include a plug-in, the function to perform, the input data, and a list of database entries on which to perform the function. The one or more tasks may be a plurality of tasks, and the method may further comprise distributing the plurality of tasks among the worker processes for processing the tasks in parallel. The biometric operation may be to enroll biometric information into the database. The biometric operation may be to perform an identification query based on a biometric sample provided as the input data.

The program code may detect a number of cores of the multi-core processor at runtime. An aggregate number of entries assigned to the one or more tasks may be all entries or a subset of all entries in the database.

The job request may be a map job request to apply a plug-in function across a number of entries in the database, and wherein the biometric operation may be restructured into a plurality of tasks distributed among the worker processes. The job request may be a standard job request, and wherein the biometric operation may be restructured into a single task assigned to one of the worker processes.

The multi-processor core may be further programmed to, when assigning each task of the one or more tasks to one of the worker processes: place each task of the one or more tasks into a queue, remove one task of the one or more tasks from the queue in response to one of the worker processes being available to process the removed task, and assign the one task removed from the queue to the available worker process.

In still another aspect, a software development kit is provided. The software development kit comprises data processor program code configured to distribute, when executed, performance of a biometric operation across a plurality of cores of a multi-core processor of a computing device, and one or more plugin modules that provide functionality to perform the biometric operation.

Embodiments of the software development kit may include one of the following features, or any combination thereof. The software development kit may further comprise one or more plugin modules that provide access to one or more databases, a reference guide providing guidance to a software developer for developing an application program based on the code library and the plug-in modules, one or more samples of application programs that implement the code library, or any combination thereof.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
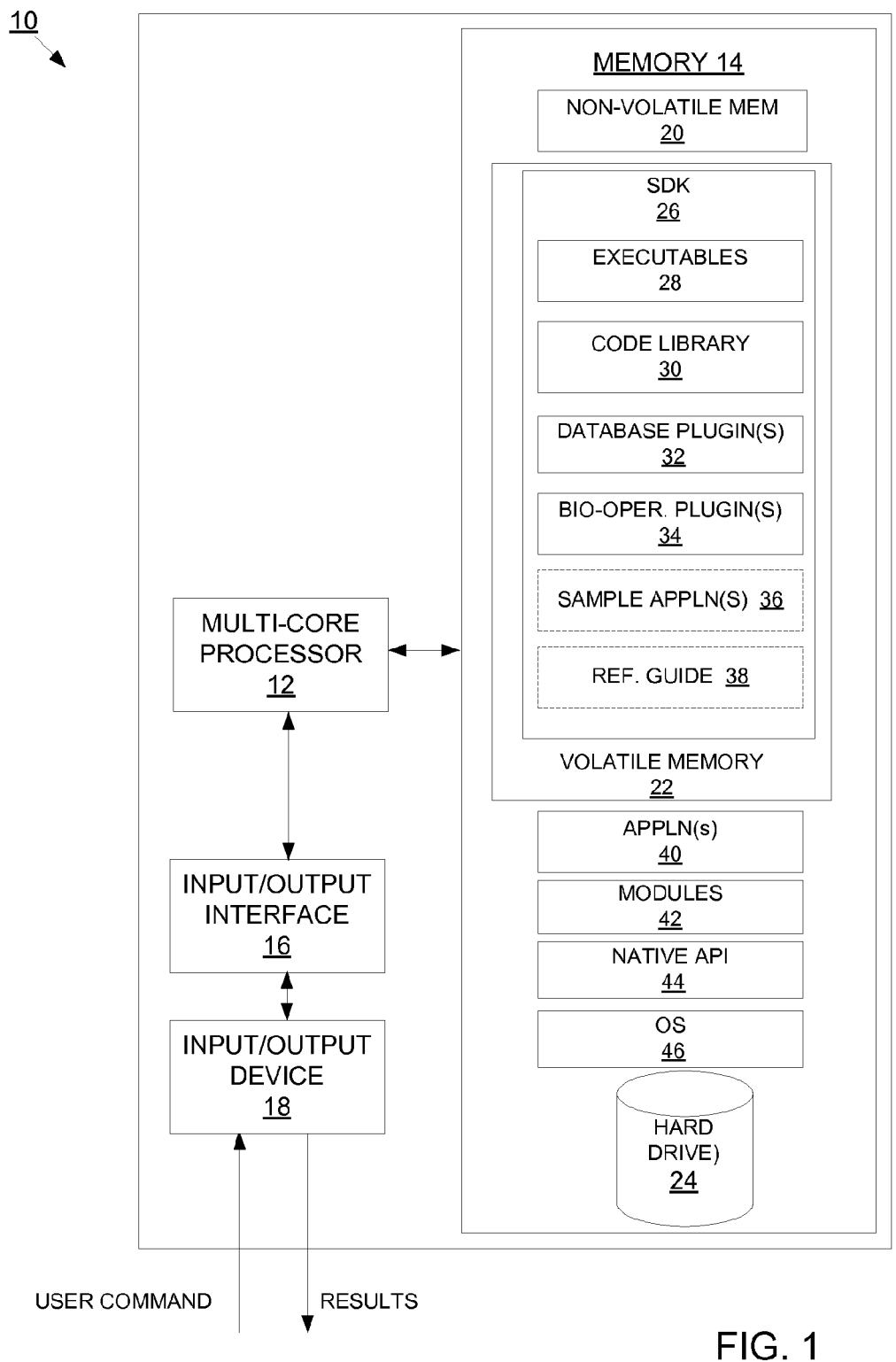
FIG. 1 is a block diagram of an embodiment of a computing system programmed to perform biometric operations in parallel.

FIG. 1 shows an embodiment of a computing system 10 programmed to perform biometric operations in parallel as described herein. Example implementations of the computing system 10 include, but are not limited to, personal computers (PC), Macintosh computers, server computers, blade servers, workstations, laptop computers, kiosks, network terminals, and hand-held devices, such as a personal digital assistant (PDA), mobile phones, smart phones, and tablets. In general, the computing system 10 is any type of computing machine with a multi-core processor 12. A multi-core processor, as used herein, is a single computing component having two or more independently operating central processing units or cores. The cores independently read and execute program instructions. Commercially available embodiments of multi-core processors have dual-cores, quad cores, six cores, eight cores, ten cores or more.

The multi-core processor 12 is in communication with memory 14 and with an input/output (I/O) interface 16. The I/O interface 16 is in communication with one or more I/O devices 18, which include, but are not limited to, a mouse, touch pad, keyboard, display screen, touch screen, a speaker, and a microphone. Although referred to generally as I/O devices, some of such devices may be an input device only (e.g., a keyboard), whereas other devices may be an output device only (e.g., a speaker). A user submits commands and receives results through an I/O device 18. The I/O interface 16 submits the user commands from the one or more I/O devices 18 to the multi-core processor 12 and returns results to the user through the one or more I/O devices 18.

The memory 14 includes non-volatile computer storage media such as read-only memory (ROM) 20, volatile computer storage media such as random-access memory (RAM) 22, and hard-disk memory 24. Typically stored in the ROM 20 is a basic input/output system (BIOS), which contains program code for controlling the basic operations of the computing system 10, including start-up of the computing system and initialization of hardware.

Stored within the RAM 22 are program code and data. Program code includes, but is not limited to, a software development kit (SDK) 26 comprised of executables 28, a code library 30, one or more database plug-ins 32, and one or more biometric operation plug-ins 34. Optionally, the SDK 26 can also include one or more samples of application programs 36 demonstrating example use the executables 28 and code library 30, and a reference guide (e.g., in text or portable document format) 38. Software developers can use the SDK 26 to construct application programs that perform biometric operations, for example, enrolling biometric images into a database, and running biometric identification searches. Before being stored in the memory 14 of the computing system 10, the SDK 26 can be embodied in an off-the-shelf product (e.g., CD ROMs) or acquired from a server through an online download.

The RAM 22 can also store application programs 40 (e.g., browser), program modules 42 (e.g., browser plug-ins), a native API (e.g., Windows API, MacOS API) 44, and an operating system 46 (e.g., Windows 95, Windows 98, Windows NT 4.0, Windows XP, Windows 2000, Linux, Macintosh, Windows Mobile™, Mobile Linux™, Symbian OS™, Palm OS™, Mobile OS™, and Android™)

The hard disk 24 stores data, for example, biometric templates. Each biometric template represents a biometric measurement of an individual enrolled by a biometric system. A biometric system uses these biometric templates for comparisons against subsequently submitted biometric samples. Biometric samples correspond to a biometric characteristic of an individual as captured by a biometric system. Examples of biometric samples include, but are not limited to, images of fingerprints, irises, and faces. Techniques for converting biometric samples into biometric templates are known in the art. The biometric templates may be aggregated within a database or data store, examples of which include, MongoDB, LevelDB, and Lightning Memory-Mapped Database (LMDB).

The executables 28 of the SDK 26 include a data processor utility that runs biometric identification searches and a data processor enroll utility for enrolling biometric images into a database. Hereafter, the data processor utilities are referred to generally as the data processor. The code library 30 includes a shared library (.DLL or .SO) or a static library (.LIB or .a) of program code that provides the core functionality of the data processor. The code library 30 can also include a Java Native Interface (JNI) shared library and a Java jar file that contains the code for using the data processor in Java™. In addition, the code library 30 includes an executable used to launch a worker process. Worker processes independently execute biometric operations; they can execute as separate threads in a single process or as separate processes.

The database and biometric operation plug-ins 32, 34, respectively, provide the available functions that the software developer can use when developing an application program. The data processor integrates with databases using the database plug-ins 32, which enable biometric operations to operate on database data in addition to input data. Each database plug-in 32 provides read and write access to a database of a given type. In one embodiment, the SDK 26 includes a database plug-in for accessing the LMDB database, another database plug-in for accessing the LevelDB database, and yet another database plug-in for accessing the MongoDB database. Other embodiments of the SDK 26 can have fewer or more than these three database types. Biometric operations can be performed on input data only, a single database entry, multiple database entries, or every database entry. In cases where multiple database entries are used, a result is returned for every entry selected. If the biometric operations to be used are all to be performed on input data only, then no database or database plugins need be present. In addition, the functionality of one or more database plug-ins 32 can be involved in the completion of a single biometric operation.

Each biometric operation plug-in 34 provides biometric operation functionality. Categories of biometric operation plug-ins can include matcher plug-ins and map plug-ins. Examples of matcher plug-ins include, but are not limited to, a plug-in that provides one-to-one fingerprint comparing, a plug-in that provides one-to-one iris comparing, and a plug-in that provides one-to-one face comparing. In general, a map plug-in provides the ability to perform a function across a database, by taking matcher plug-in functions and applying them concurrently across multiple entries in the database. The functionality of one or more biometric operation plug-ins 34 can be involved in the completion of a single biometric operation. Adding new biometric operations to a biometric system, through the addition of new biometric operation plug-ins, requires no modifications to the data processor or code library 30.

Figure 2:
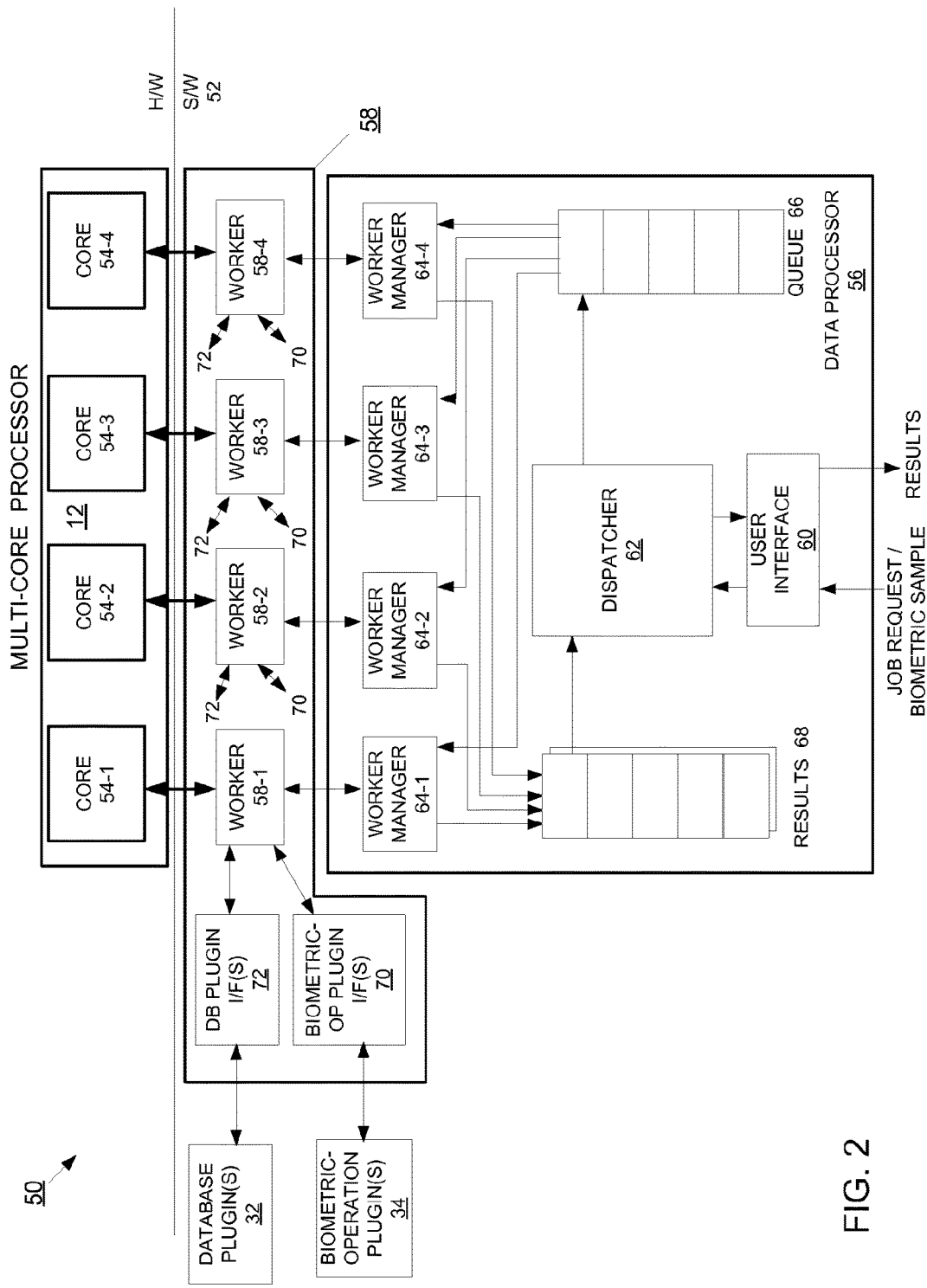
FIG. 2 is a block diagram of an embodiment of a biometric system.

FIG. 2 shows a block diagram of an embodiment of a biometric system 50 comprising a multi-core processor 12 programmed with software 52 for performing user-requested jobs. As used herein, a job is a high-level biometric operation that a user wishes to perform. Examples of high-level biometric operations include, but are not limited to, enrolling biometric data into a database or performing an identify query.

In this example embodiment, the multi-core processor 12 has four cores 54-1, 54-2, 54-3, and 54-4 (generally, 54). The principles described herein can extend to any type of multi-core processor having two or more cores. The cores 54 execute code independently and concurrently to provide parallel processing in the performance of the job.

The software 52 executed by the multi-core processor 12 includes a data processor process (hereafter, data processor) 56 and worker processes 58-1, 58-2, 58-3, and 58-4 (generally, worker 58). The data processor 56 includes a user interface 60, a dispatcher 62, a worker manager 64-1, 64-2, 64-3, 64-4 (generally, 64), a queue 66, and one or more results buffers 68. The software 52 provides a job results buffer 68 for each job currently being performed by the multi-core processor 12; all jobs in progress concurrently share the queue 66. The separate boxes within the data processor 56 represent a logical separation of functionality, although all functions are integrated within the data processor 56.

In general, the data processor 56 is a library that abstracts and executes biometric operations, utilizing the dispatcher 62, worker managers 64, and queue 66 to deliver tasks to workers 58. As used herein, a task is a low-level biometric operation to be performed. Examples of tasks include, but are not limited to, compressing a bitmap image file (BMP) fingerprint image to a Wavelet Scalar Quantization (WSQ) fingerprint image or performing a match using a matcher plug-in with two input images. When multiple workers 58 execute, multiple tasks can be performed in parallel.

Each worker 58 is program code that can independently execute biometric operations, continuously waiting until a task becomes available on the common queue 66, then obtaining ownership and executing that task. The workers 58 can be part of the same process as the dispatcher 62 as threads or each worker 58 can be a separate process. Where each worker 58 resides in a separate process, each worker 58 has an associated worker manager process 64 that directly pulls a task off the queue 66 and then sends the task to the worker 58. The worker 58 receives and performs the task and then returns the results to its associated worker manager 64.

Each worker 58 is also in communication with one or more database plug-in interfaces 72 and with one or more biometric operation plug-in interfaces 70. Worker functionality is acquired from the database and biometric operation plug-ins 32, 34, respectively. Through a database plug-in interface 72, each worker 58 is able to incorporate the functionality of a given database plug-in 32. Through a biometric operation plug-in interface 70, each worker 58 is able to incorporate the functionality of a given biometric operation plug-in 34. Each database and biometric operation plug-in 32, 34, respectively, reports whether a given performed function was valid or whether any other errors were encountered.

The number of workers 58 used by the data processor 56 is configured by the software developer using the data processor 56. This number can be an explicitly declared (e.g., 2, 5, 10). Alternatively, the data processor 56 can automatically detect the number of cores 54 available at runtime using standard library functionality (e.g., C++) to determine the number of cores, and, correspondingly, the number of workers 58 to launch.

The user interface 60 is in communication with the user to receive job requests and input data (e.g., a biometric sample) and to provide the results of the job to the user. A biometric reader, for example, a fingerprint reader, can supply the input data.

The dispatcher 62 is in communication with the user interface 60 to obtain the user-supplied instructions and input data. In addition, the dispatcher 62 is in communication with the queue 66 upon which the dispatcher 62 places tasks to be performed by the workers 58. Further, the dispatcher 62 is in communication with the results buffer 68 of each job from which the dispatcher 62 collects the separate results produced by each of the workers 58 performing their assigned tasks and compiles the results of the job for forwarding to the user.

Each worker manager 64 is associated with one of the worker processes 58 and in communication with the queue 66 and with the results buffer 68. Each worker manager 64 removes a task from the queue 66 when its associated worker 58 is available, and passes that task to that worker 58. When that worker 58 completes the assigned task, the results return to its associated worker manager 64. The worker manager 64 then places the results of the task into the appropriate results buffer 68 (i.e., associated with the job for which the task is performed) for subsequent collection by the dispatcher 62.

Figure 3:
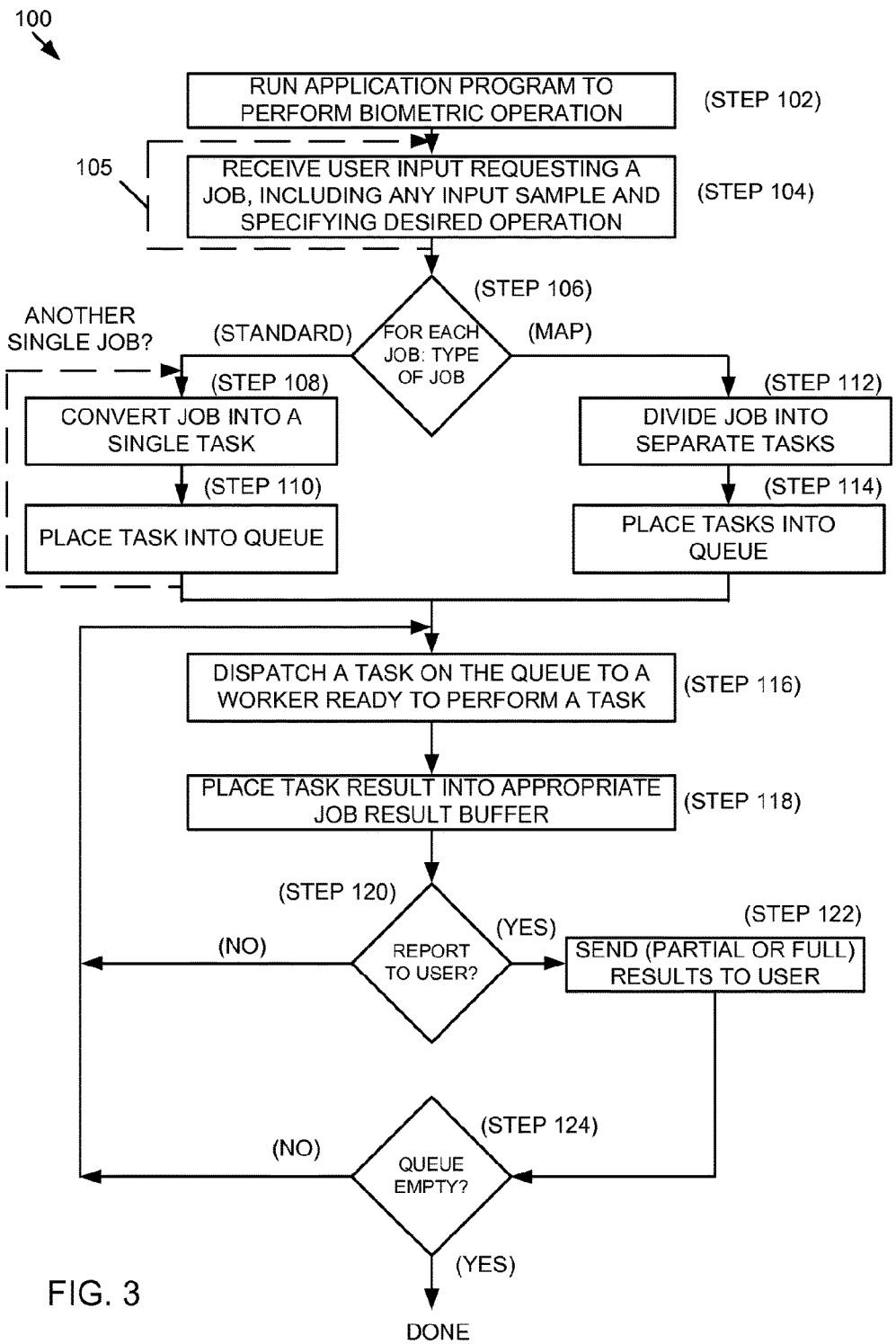
FIG. 3 is a flow chart of an embodiment of a process for performing a biometric operation.

FIG. 3 shows an embodiment of a process 100 for performing a biometric operation, using the multiple cores of the multi-core processor 12 to process tasks associated with one or more jobs in parallel. In the description of the process 100, reference is made to elements shown in FIG. 1 and FIG. 2. At step 102, the user runs an application program developed from the SDK 26 and configured to perform a desired biometric operation. Through the user interface 60, the data processor 56 receives (step 104) user input requesting performance of a job, the user input including a biometric sample, which may be obtained through a biometric reader, and specifying the desired biometric operation. A user may request more than one job (as represented by dashed arrow 105), to be performed concurrently.

The data processor 56 can accept (step 106) two types of jobs from the user: a standard job; and a map job. A standard job includes the desired biometric operation plug-in 34 or database plug-in 32, the function to run, and the input data for the function. The data processor 56 turns (step 108) a standard job into a single task and the dispatcher 62 places (step 110) the task into the queue 66 for a worker 58 to run. If multiple standard jobs are to run concurrently, the data processor 56 can take advantage of the parallel processing capabilities of the multi-core processor 12, distributing the multiple single standard jobs (turned into single tasks) across the workers 58. As an example, the user can request a standard job to enroll a biometric sample in a MongoDB database. In response, the data processor (i.e., enroll utility) 56 produces a single task, specifying the enroll function, the MongoDB database plug-in 32, and providing the biometric sample to be enrolled.

A map job acquires its "map" name as a reference to the general programming concept map, which applies a single function to a list of items. In the biometric system 50, a map job specifically refers to applying a biometric operation plug-in function across a number of database entries, which either can be the entire database or a selected subset of the database. The data processor 56 generates (step 112) multiple tasks by splitting up the list of applicable database entries, and the dispatcher 62 places (step 114) each task into the queue 66. Each task contains a desired biometric operation plug-in 34, a function to run, input biometric data, and a database plugin with a list of database entries on which to perform the function. The list of database entries that accompanies each task can be one or more entries. As an example, the user can request a map job to identify an individual associated with a biometric sample. In response, the data processor 56 produces a multiple tasks, specifying a matcher biometric operation plug-in 34, a matcher function, and the LevelDB database plug-in 32, providing the biometric sample to be matched and a different list of database entries with which to compare the biometric sample.

At step 116, a worker manager 64 removes a task from the queue 66 and dispatches the task to its associated worker 58 ready (available) to perform a task. The current jobs, if more than one, share queue 66. Each worker 58 is associated with a different one of the cores 54 of the multi-core processor 12. The cores 54 work in parallel, each executing the function associated with the task assigned to its associated worker 58 in accordance with the functionality provided by the associated database and biometric operation plug-ins 32, 34, respectively. The assigning of tasks to workers 58, as workers become available, can attain a substantially balanced distribution of the workload among the workers 58 and, thus, efficiently employ the cores 54 throughout the execution of each job.

At step 118, each worker manager 64 places the results of the task performed by its associated worker 58 into the results buffer 68. Each job has its own associated results buffer 68; and the task results are placed in the appropriate results buffer 68. After a task result is added to a job result buffer 68, the dispatcher 62 decides (step 120) whether to report results to the user for that particular job. The decision is affirmative if one or both of the following conditions are true: 1) all tasks associated with the job are completed, hence, the job is complete; 2) a threshold number of tasks, out of the total number of tasks for the job, have been completed. Normally, some tasks for the particular job remain to be done when the threshold is reached. This threshold number is configurable by the user. If both conditions are unsatisfied, the process 100 continues dispatching (step 116) tasks from the task queue 66.

When a particular job is complete or when a threshold number of task results has been collected for the job, the dispatcher 62 acquires the results (partial or full) from the results buffer 68 associated with the job and sends (step 122) those results to the user. The data processor 56 presents the partial or full outcome of the job to the user through the user interface 60.

If, at step 124, the queue 66 contains tasks, the process 100 continues by dispatching (step 116) one of the queued tasks to an available worker 58. For instance, in the event the dispatcher 62 reports partial results, the queue 66 still holds at least those tasks remaining for the partially completed job. In addition, the queue 66 may contain tasks associated with other jobs not yet completed. If, instead, at step 124, the queue 66 is empty, all submitted jobs are complete; the process 100 is done.

In addition to making efficient use of the multi-core processor 12 during the performance of the job, the data processor 56 can also make efficient use of the memory 14. For example, certain biometric operations, such as a biometric identification search, can occur in stages. In a biometric identification search, an input biometric sample is compared with a database containing a large number of biometric templates. A first stage of the search quickly compares the input biometric sample with all of the candidate biometric templates, sacrificing accuracy in order to reduce the large number of candidate biometric templates to a lesser number. A second stage and, optionally, a third stage operate progressively slower than their previous stage, performing a progressively more time consuming and accurate comparison than their previous stage, while progressively reducing the number of candidate biometric templates that remain as possible matches to the input biometric sample. A final stage can be the slowest but most accurate of all the stages, searching through the fewest candidate biometric templates in search of a match.

The number of stages in a biometric operation is configurable, and can be determined by a particular biometric operation plug-in 34. A single biometric operation plug-in 34 can provide the functionality of all stages, or different biometric operation plug-ins 34 can provide the functionality of a different stage or a different subset of stages. In general, the stages run in serial; the first stage completes before the second stage can begin. Alternatively, there can be some overlap between the executions of the stages; the second stage can begin as soon as the first stage identifies a potential match and can execute its function while the first stage continues to search through the candidate biometric templates. In this instance, the cores 54 of the multi-core processor 12 may be working concurrently on tasks associated with different stages of the biometric operation.

In general, the gallery of biometric templates resides on the hard disk 24, which has memory accesses that are considerably slower than those to RAM 22. When a database of biometric templates initializes, a small number of the biometric templates can be preloaded from the hard disk 24 to the RAM 22. The remaining biometric templates can remain on the hard disk 24. For the first stage of the biometric identification search, which processes the greatest number of biometric templates of all the stages, the candidate biometric templates can be loaded from hard disk 24 to RAM 22, in advance of being needed by a worker 58. For each of the later stages, which work with progressively fewer candidate biometric templates than an earlier stage, the biometric templates can remain on the hard disk 24 until a worker 58 requires the biometric template for a comparison, at which point the memory access is made to the hard disk 24.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated fingerprint processing system, as a plug-in, or the like. The system can also be implemented by physically incorporating the system and method into a software and/or hardware system, such as the hardware and software systems of an image processor.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method of performing a biometric operation, the method comprising:
   receiving a job request to perform a biometric operation, the job request: including input data, identifying a database to be used in the performance of the biometric operation in association with a database plug-in, each database plug-in providing read and write access to a database of a given type, the job request further specifying a biometric operations plug-in function to be performed across a number of entries in the database, the number of entries in the database being a subset of the entries in the database;
   restructuring the biometric operation as a plurality of tasks;
   assigning the number of entries in the database to each of the plurality of tasks;
   generating an independent worker process for each different core of the multi-core processor;
   assigning each task of the plurality of tasks to one of the worker processes;
   distributing the plurality of tasks among the worker processes, the worker processes acquiring their functionality from the database plug-in and biometric operations plug-ins, respectively;
   collecting results produced by each worker process assigned to one of the plurality of tasks; and
   reporting a result of the biometric operation based on the collected results to a user.

2. The method of claim 1, wherein each task includes an indication of a plug-in, the function to perform, the input data, and a list of database entries on which to perform the function.

3. The method of claim 1, further comprising distributing the plurality of tasks among the worker processes for processing the tasks in parallel.

4. The method of claim 1, wherein the biometric operation is to enroll biometric information into the database.

5. The method of claim 1, wherein the biometric operation is to perform an identification query based on a biometric sample provided as the input data.

6. The method of claim 1, further comprising detecting a number of the processor cores at runtime.

7. The method of claim 1, wherein a number of entries assigned to the one or more tasks is a subset of all entries in the database.

8. The method of claim 1, wherein a number of entries assigned to the one or more tasks is all entries in the database.

9. The method of claim 1, wherein the job request is a map job request to apply a plug-in function across a number of entries in the database, and wherein the biometric operation is restructured into a plurality of tasks distributed among the worker processes.

10. The method of claim 1, wherein the job request is a standard job request, and wherein the biometric operation is restructured into a single task assigned to one of the worker processes.

11. The method of claim 1, wherein assigning each task of the one or more tasks to one of the worker processes comprises:
    placing each task of the one or more tasks into a queue;
    removing one task of the one or more tasks from the queue in response to one of the worker processes being available to process the removed task; and
    assigning the one task removed from the queue to the available worker process.

12. A computer system for performing a biometric operation, the computer system comprising:
    memory storing program code used to perform a biometric operation, the program code including one or more database plugins, one or more biometric operation plugins, and program code that coordinates performance of the biometric operation; and a multi-core processor executing the program code that coordinates performance of the biometric operation to:

receive a job request to perform the biometric operation, the job request including input biometric data, identifying one of the one or more database plug-ins to be used in the performance of the biometric operation, each database plug-in providing read and write access to a database of a given type, the job request further specifying a biometric operations plug-in function to be performed across a number of entries in the database, the number of entries in the database being a subset of the entries in the database;

restructure the biometric operation as a plurality of tasks, assign the number of entries in the database to each of the one or more tasks;

generate an independently executing worker process for each different core of the multi-core processor;

assign each task of the plurality of tasks to one of the worker processes;

distributing the plurality of tasks among the worker processes, the worker processes acquiring their functionality from the database plug-in and biometric operations plug-ins, respectively;

collect results produced by each worker process assigned one of the plurality of tasks; and report a result of the biometric operation based on the collected results to a user.

13. The computer system of claim 12, wherein each task includes: a plug-in, the function to perform, the input data, and a list of database entries on which to perform the function.

14. The computer system of claim 12, further comprising distributing the plurality of tasks among the worker processes for processing the tasks in parallel.

15. The computer system of claim 12, wherein the biometric operation is to enroll biometric information into the database.

16. The computer system of claim 12, wherein the biometric operation is to perform an identification query based on a biometric sample provided as the input data.

17. The computer system of claim 12, herein the program code detects a number of cores of the multi-core processor at runtime.

18. The computer system of claim 12, wherein a number of entries assigned to the one or more tasks is a subset of all entries in the database.

19. The computer system of claim 12, wherein a number of entries assigned to the one or more tasks is all entries in the database.

20. The computer system of claim 12, wherein the job request is a map job request to apply a plug-in function across a number of entries in the database, and wherein the biometric operation is restructured into a plurality of tasks distributed among the worker processes.

21. The computer system of claim 12, wherein the job request is a standard job request, and wherein the biometric operation is restructured into a single task assigned to one of the worker processes.

22. The computer system of claim 12, wherein the multi-processor core is further programmed to, when assigning each task of the one or more tasks to one of the worker processes:

place each task of the one or more tasks into a queue;

remove one task of the one or more tasks from the queue in response to one of the worker processes being available to process the removed task; and assign the one task removed from the queue to the available worker process.

* * * * *